United States Patent
Nakano

(10) Patent No.: US 9,741,123 B2
(45) Date of Patent: Aug. 22, 2017

(54) TRANSFORMATION OF 3-D OBJECT FOR OBJECT SEGMENTATION IN 3-D MEDICAL IMAGE

(71) Applicant: CANON KABUSHIKI KAISHA, Tokyo (JP)

(72) Inventor: Yuta Nakano, Juan-les Pins (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,821

(22) Filed: Aug. 26, 2015

(65) Prior Publication Data

US 2016/0063721 A1 Mar. 3, 2016

(51) Int. Cl.
| | |
|---|---|
| *G06K 9/34* | (2006.01) |
| *G06T 7/00* | (2017.01) |
| *G06K 9/52* | (2006.01) |
| *G06T 15/20* | (2011.01) |
| *G06T 7/10* | (2017.01) |
| *G06T 7/11* | (2017.01) |
| *G06T 7/12* | (2017.01) |
| *G06T 7/168* | (2017.01) |

(52) U.S. Cl.
CPC .............. *G06T 7/0079* (2013.01); *G06K 9/52* (2013.01); *G06T 7/10* (2017.01); *G06T 7/11* (2017.01); *G06T 7/12* (2017.01); *G06T 7/168* (2017.01); *G06T 15/20* (2013.01); *G06T 2207/20161* (2013.01); *G06T 2207/30096* (2013.01)

(58) Field of Classification Search
CPC . G06T 2200/04; G06T 7/0081; G06T 7/0079; G06T 7/402; G06T 19/20; G06T 15/08; G06T 2207/30096; G06K 9/00201; G06K 9/3241
See application file for complete search history.

(56) References Cited

U.S. PATENT DOCUMENTS

| | | | |
|---|---|---|---|
| 7,333,644 B2 * | 2/2008 | Jerebko | G06T 7/0083 382/128 |
| 2004/0228529 A1 | 11/2004 | Jerebko et al. | |
| 2006/0050991 A1 | 3/2006 | Jerebko et al. | |
| 2012/0041722 A1 * | 2/2012 | Quan | G06T 7/0071 703/1 |

OTHER PUBLICATIONS

Wang, J., et al., "Segmentation of pulmonary nodules in three-dimensional CT images of a spiral-scanning technique", Med. Phys., Dec. 2007, pp. 4678-4689, vol. 34, No. 12.

(Continued)

*Primary Examiner* — Eueng-Nan Yeh
(74) *Attorney, Agent, or Firm* — Canon USA Inc., IP Division

(57) ABSTRACT

A method and apparatus for segmenting an object from a three-dimensional image are disclosed. According to the method, first, a surface of the object is estimated using scale estimation processes such as Laplacian-of-Gaussian filters in one, two or three dimensions. Second, the estimated surface is transformed by having a shrink function applied to it independently in each dimension to give a regularly shaped (preferably substantially spherical), non-isotropic shape. The object is segmented from the volume around it, and is inverse-transformed to obtain the original shape, which shape is then isolated from the image volume.

49 Claims, 13 Drawing Sheets

(56) References Cited

OTHER PUBLICATIONS

Sethian, J.A., "Level Set Methods and Fast Marching Methods; Evolving Interfaces in Computational Geometry, Fluid Mechanics, Computer Vision and Materials Science", Cambridge University Press, 1999.
Lindeberg, T., "Feature detection with automatic scale selection", International Journal of Computer Vision, 1998, pp. 79-116, vol. 30, No. 2, Kluwer Academic Publishers.
Jirapatnakul, A., et al., "Automated Nodule Location and Size Estimation Using a Multi-scale Laplacian of Gaussian Filtering Approach", Annual International Conference of the IEEE EMBS, Sep. 2-6, 2009, pp. 1028-1031.
Osher, S., et al., "Fronts Propagating with Curvature Dependent Speed: Algorithm Based on Hamilton-Jacobi Formulations", Journal of Computational Physics, 1988, pp. 12-49, vol. 79.
GB Search Report issued in GB1415251.6 dated Feb. 23, 2015.

\* cited by examiner

TRANSFORMATION OF 3-D OBJECT FOR OBJECT SEGMENTATION IN 3-D MEDICAL IMAGE

TECHNICAL FIELD

The present invention relates to object segmentation in images and in particular, to the segmentation of objects such as lymph nodes, lesions, nodules or tumours in medical images.

CROSS REFERENCE TO RELATED APPLICATIONS

This application claims the benefit under 35 U.S.C. §119 (a)-(d) of United Kingdom Patent Application No. 1415251.6, filed on 28 Aug. 2014 and entitled "Transformation of 3-D Object for Object Segmentation in 3-D Medical Image". The above cited patent application is incorporated herein by reference in its entirety.

BACKGROUND ART

Object segmentation is a technique of recognising a shape or boundary of an object within a digital image. The aim of object segmentation is to change the representation of objects in an image (such as a medical image) so that the image is easier to analyse, for example, to determine whether an object has changed over time, from one image to another. There are many techniques that accomplish this object recognition which may be more or less appropriate depending on the range of contrast within the image, the extent of contrast between the object and the background, the scale or relative size of the object, the format of the image data, and so on. However, what most techniques have in common is that each pixel in an image (or voxel in a 3-D image) is assigned some sort of label corresponding to certain visual characteristics (such as grey scale, intensity, etc.). In this way, pixels (voxels) assigned a same or similar label may be seen by a viewer as being grouped together for some reason, for example to show that they are part of the same structure (e.g. the same object) in the image.

A type of object segmentation known as "blob detection" is described in T. Lindeberg's "Feature detection with automatic scale selection" in the International Journal of Computer Vision, Vol. 30, pp. 79-116, 1998. In this paper, a form of scale determination is described that uses a Laplacian operator of a Gaussian model (Laplacian-of-Gausian or LoG operator or filter) to determine relative positions and scales of "blobs" in an image.

A. Jirapatnakul, S. Fotin et al.'s "Automated Nodule Location and Size Estimation Using a Multi-scale Laplacian of Gaussian Filtering Approach" in the Annual International Conference of the IEEE EMBS, pp. 1028-1031, 2009 describes the application of Laplacian-of-Gaussian filtering from a starting point placed near the centre of a blob to find the size of the blob.

In both techniques mentioned above, an overall estimate of the scale of the blob is to be found using the LoG filter, which iteratively checks different scales (sigma values, to be described later) and finds one that is most likely to be the scale of the blob in question. In one dimension, the scale may be a distance from an origin to an estimated edge of the blob; in two dimensions, the scale may be a radius of a circle representing the blob and in three dimensions, the scale may be a radius of a sphere representing the blob. The scales determined by LoG filters are based on positions of change in contrast relative to a centre position. The change in contrast is assumed to be the edge of the blob. A "region-growing" approach analyses each pixel from a central point outwards, determining whether each pixel conforms to parameters used to identify an object. When pixels that do conform cease to be found, it is assumed that the positions at which the pixels cease to conform are positions corresponding to the edge of the object.

This process of "scale estimation", which uses a LoG operation to estimate a scale of the object to be segmented, is a useful tool in object segmentation. For example, in the region-growing approach, scale estimation can be used to constrain an excessive region expansion (i.e. the process of analysing pixels increasingly outwards from the central point) because an approximate maximum size of the object is known (i.e. outside of a certain region found by scale estimation, pixels conforming to the parameters for inclusion in the object are unlikely to exist). However, there are potential problems in the scale estimation process. One of the problems is the risk of a very large computation time. In conventional scale estimation methods, such as those referred to above that use a LoG filter, the computation time is very large because the LoG filter is applied over a large processing range (i.e. over a large search space) and to every point therein. In general, scale estimation is an iterative process with changing parameters related to the number of points in the processing range and giving rise to a scale for each point. One then determines an appropriate scale from all computational results which, for a large processing range, may be many.

A next step in object segmentation processing (after the scale estimation step) may be the segmentation itself involving a region-growing method. From a central "seed" point, all points in a region of interest are analysed to determine whether they satisfy the criteria chosen to define the object. All points satisfying those criteria are determined to belong to the object.

An alternative segmentation process may be used. It may involve a level set algorithm as described in S. Osher and J. Sethian's "Fronts Propagating with Curvature-Dependent Speed: Algorithm Based on Hamilton-Jacobi Formulations" in the Journal of Computational Physics, Vol. 79, pp. 12-49, 1988 and in J. Sethian's "Level Set Methods and Fast Marching Methods" in the Cambridge University Press, 1999. These documents describe an algorithm that defines a front propagating with curvature-dependent speed. The way this is done is to take a surface, the "movement" (used as a time-dependent metaphor for variation over a dimension in space) of which is to be predicted, and to intersect it with a plane to define a contour. For example, a sphere may be bisected about its equator with a plane to define a circle on the plane. This contour (e.g. the circle) has a definable shape at time t=0 and in order to define how the contour changes over time (e.g. the diameter of the circle decreasing as the plane moves from the equator to a pole of the sphere), forces are applied to its "fronts" (e.g. its circumference) to define the direction in which the fronts will travel (e.g. inwards) as t changes.

In a case of a series of medical images such as computed tomography (CT) scans that combine to give a three-dimensional representation of an object in the human body for instance, the level set algorithm may be used to define the outer surface of the three-dimensional object. In order to do this, however, the edges of the object in all of the images making up the three-dimensional image must first be determined.

It is known to find the edges of the object using a segmentation process such as region-growing from a central seed point. From the central seed, an iterative process is applied to pixels surrounding the seed, going outwards until a pixel is reached that does not have the predefined parameters of the object (e.g. texture, colour, intensity, etc.) When several pixels are reached that are adjacent and that no longer satisfy the predetermined parameters, an edge of the object is presumed to have been reached. To build up the three-dimensional object shape, the region-growing process may be applied to multiple parallel images. The level set algorithm helps to reduce processing by reducing the need for a user to input a seed point in each image. It does this by using a limited number of object edges to build up the full 3-D shape.

One problem with these scale estimation and segmentation processes is that objects that are to be segmented, such as lymph nodes, are rarely perfectly spherical. Therefore, assumptions based on three-dimensional symmetry of a lymph node can cause large inaccuracies in the segmentation processes. For example, if a three-dimensional (3-D) LoG filter is applied to a lymph node that has different lengths in the three dimensions, the LoG filter is likely to estimate the scale of the lymph node as being a sphere with a radius equal to half of one of the lengths, that radius being dependent simply on which pixel-defined edge or LoG "peak" in a LoG output was found first in the iterative process or which "peak" was highest (peaks defining changes of pixel parameter and therefore likely edges of objects).

U.S. Pat. No. 7,333,644 describes the interpolation of a 3-D lesion surface into a surface representation in spherical coordinate space based on a centroid location of the lesion. Thus, the interpolation involves a transformation that changes the coordinates from Cartesian (x,y,z) into spherical $r(\phi,\theta)$. This interpolation process is intended to render the sub-volume (including the lesion and its surrounding environment) isotropic, i.e., to make the dimensions of the pixels in the x-y slices the same as the dimensions of the pixels in the z-direction. This gives a slightly easier set of coordinates with which to work, but it does not deal with the problem of irregularly-shaped objects. The spherical coordinates cannot represent the position of each voxel without the fixed centroid because all parameters in the spherical coordinate depend on the centroid. Thus, processing remains laborious.

SUMMARY OF THE INVENTION

In consideration of the above problems, it is desired to provide an apparatus and method for reducing the processing load during object segmentation in a case when the object is irregularly-shaped by transforming the object into a non-isotropic but regularly-shaped object on which object segmentation is to be performed.

According to a first aspect, there is provided a method for object segmentation comprising the steps of: estimating a surface of an object in an original volume; transforming the surface of the object to render a regularly-shaped (preferably substantially spherical) surface; processing the (preferably substantially spherical) surface to separate the object from the surrounding volume; inverse-transforming the (preferably substantially spherical) surface to the original object surface; and extracting a volume corresponding to the object from the original volume.

The advantage of transforming the object into a spherical shape, even though it is non-isotropic, is that the object may more easily be isolated from the surrounding volume because any analysis made to the object may be made symmetrically in all three dimensions. Of course, a cube or other regular shape may be used.

The transformation of the surface of the object preferably comprises transforming each dimension of the object surface independently from others of the dimensions. For example, a different function is applied to each dimension of the object surface. The function may be calculated as follows: obtain a three-dimensional scale estimation of the object $Scale_{3D\ space}$; obtain a one-dimensional scale estimation for each dimension of the object $Scale_{each\ direction}$; and multiply a respective shrink function $SR_{each\ direction}$ with each respective one-dimensional scale estimation for each dimension of the object according to the following formula:

$$SR_{each\ direction} = \frac{Scale_{3D\ space}}{Scale_{each\ direction}}.$$

However, preferably, if the one-dimensional scale estimation in each dimension is smaller than the three-dimensional scale for a specific dimension, the shrink functions are all 1.0. This prevents the increase in size of any dimension of the estimated object. Conversely, if the scale of one dimension is found (e.g.) by a user inserting a bounding box or boundary shape around the object and this scale is found to be larger than the three-dimensional scale estimation, only this one dimension will have the shrink rate applied to it.

This transformation aims to transform the surface of the object surface into a non-isotropic regular shape such as a sphere. One way of doing this is to change the pixel pitch in the different dimensions. A first dimension might have the original image pixel pitch; the second might have the pixel pitch reduced by a first rate and the third might have the pixel pitch reduced by a second rate, or even enlarged by another rate. The result, though, is a regular, 3-dimensional shape.

This transformation may alternatively be applied to two dimensions to segment the object in a two dimensional image.

Following on from the above, inverse-transforming the spherical surface may comprise multiplying an inverse of the shrink function to each respective dimension of the object.

The estimation of the surface of the object may be performed in several ways. A preferred way is to use an input boundary shape to calculate a processing range, then to apply a Laplacian-of-Gaussian (LoG) filter to the points in that processing range. The LoG filter may have a one-, two- or three-dimensional kernel to estimate a scale in one, two or three dimensions. As the boundary shape is likely to be input for two dimensions, it is preferable to make a first rough estimation of the object scale in three dimensions based on a dimension of the boundary shape, and then to refine the estimation (especially in the third dimension not covered by the boundary shape) using the rough estimation as a basis for further processing ranges. For example, based on the first rough estimation in three dimensions using a three-dimensional kernel, a processing range may be calculated for one, two or three of the dimensions to obtain a more precise scale estimation using a one-dimensional kernel for each dimension. In other words, the boundary shape may provide for a first processing range for rough scale estimation, the rough scale estimation then being used to calculate a second processing range for further, more refined scale estimations. The rough and refined scale estimations may be performed with LoG filters with one-, two- or three-dimensional kernels.

According to a second aspect, there is provided a method of segmenting an object from an image comprising: receiving the image; performing scale estimation of the object in three dimensions including: inputting a boundary shape around the object, defining a processing area based on the boundary shape, and performing a scale estimation within the processing area to obtain an estimated scale of the object; the method further comprising: transforming the object into a regularly-shaped surface based on the scale estimation; rough segmentation for estimating a regular shape representing the object; fine segmentation comprising a level-set method for refining the shape of the object based on the regular shape; inverse-transforming the object into its original volume; and extracting the refined shape of the object from the image.

According to a third aspect, there is provided an image-processing apparatus for segmenting an object from a three-dimensional image, the apparatus comprising: an estimator for estimating a surface of the object in an original volume; a transformer for transforming the surface of the object to render a regularly-shaped surface; a processor for processing the regularly-shaped surface to separate the object from the surrounding volume; an inverse-transformer for inverse-transforming the regularly-shaped surface to obtain the original object surface; and an extractor for extracting a volume corresponding to the object from the original volume. Such an apparatus may be a computer or even a processor in a medical imaging modality such as an X-ray or CT (computed tomography) machine.

BRIEF DESCRIPTION OF THE DRAWINGS

The invention will be described below purely by way of example with reference to the following figures.

DESCRIPTION OF THE EMBODIMENTS

The following description will describe preferred embodiments for segmenting lymph nodes from three-dimensional medical images such as computed tomography (CT) images. Of course, the described embodiments can be used for segmenting other objects such as lesions, tumours or nodules or other objects discernable in a medical image.

The preferred embodiments follow an ordered process that involves manipulating a region of interest (ROI) in a volume (three-dimensional or 3-D) image in order to perform Laplacian-of-Gaussian (LoG) filtering on the object image to estimate the object's scale. Once the object's scale has been estimated, the ROI is transformed to give an object shape that is easier to process during segmentation processing. Then, a seed region is defined and a region-growing segmentation method is applied to the object image, its thresholds and seed regions being based on the estimated scale and finally, the segmentation is refined using a level set process and the segmented object is displayed once the ROI has been inverse-transformed to render it back to its original scale. The embodiments described below are primarily concerned with the transformation of the region of interest in the volume image in order to give an optimum shape for segmentation processing.

Figure 1:
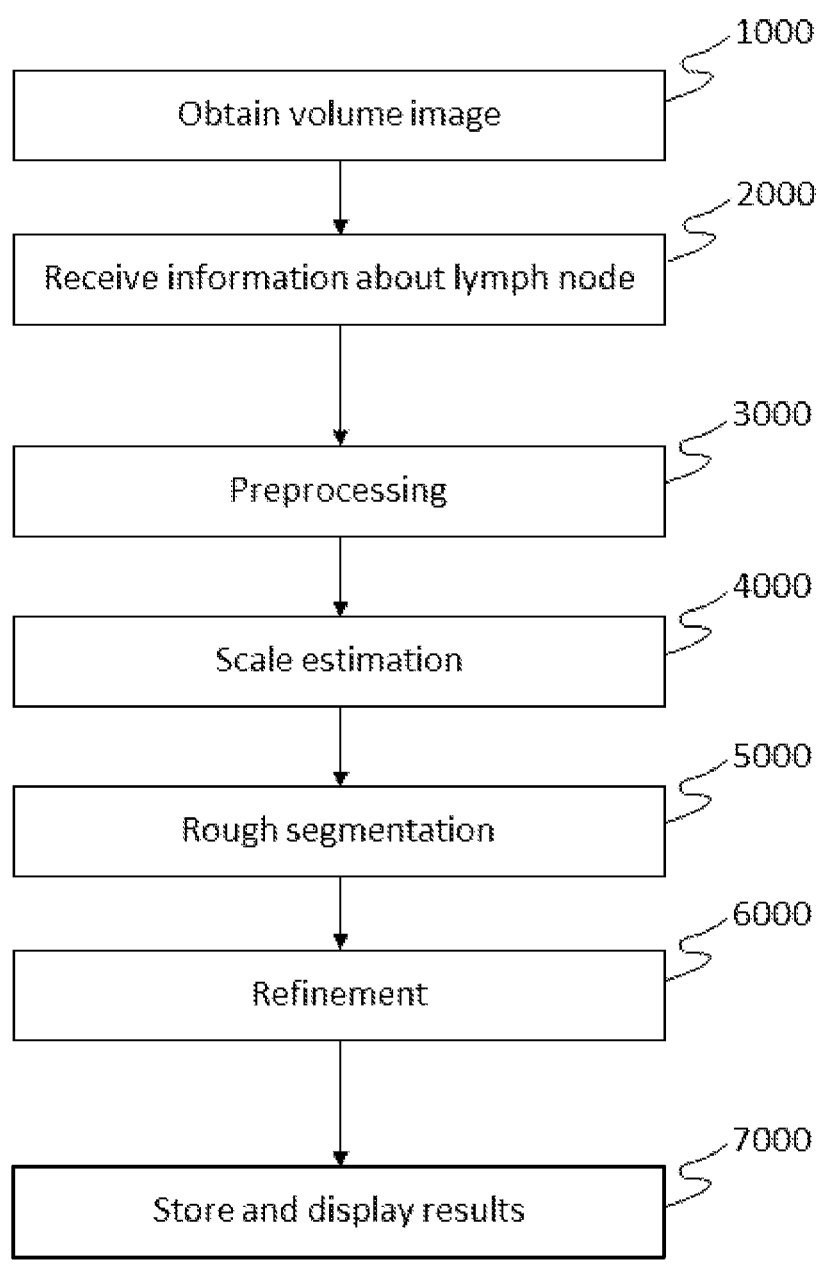
FIG. 1 is a flowchart showing a lymph node segmentation process.

A preferred process of lymph node segmentation from a three-dimensional image data set is illustrated in FIG. 1 and described below. A similar process can be applied to the segmentation of the lymph node from a two-dimensional image data set.

The first step 1000 shown in FIG. 1 is to obtain the images using a processor such as a computer connected to a modality or imaging device such as a CT scanner, ultrasound scanner, X-ray detector, and the like. While viewing such images, a user inputs information to identify a target lymph node in step 2000. Such information may comprise a central point in the middle of the lymph node or preferably a "bounding box" around the outside of the lymph node. The information may be input using a user interface and input means such as a mouse, touchscreen, joystick or keyboard. The bounding box may be square, rectangular, circular or any shape imputable by a user. The following specific embodiments are based on the assumption that a rectangular bounding box has been input or that a square bounding box has been extrapolated by a processor based on a central point input by a user.

Once identified, the lymph node of interest undergoes a segmentation process that comprises four modules:
1. pre-processing in step 3000;
2. scale estimation in step 4000;
3. rough segmentation in step 5000; and
4. refinement in step 6000.

Finally, the processor stores the segmentation results in a storage means such as a hard drive or other such memory and displays the results on a display means such as a computer screen or other digital display in step 7000.

The preferred embodiments use the bounding box input by the user to specify a processing range for the scale estimation that is different from that of the prior art. The specified processing range will not be the whole of the region of interest, but will be, in a preferred embodiment, an annular shape (or sphere with a hollow core in three dimensions) that is intended to overlap with the edge of the lymph node so that the LoG filter peaks are more likely to correspond to edges of the lymph node and the likelihood of false peaks is reduced. This same method may then be applied to all three dimensions of the image data set to obtain a processing range in three dimensions (from which the scale estimation may be found in three dimensions). Alternatively, a scale estimation value in three dimensions may be extrapolated from the scale estimated in two dimensions without going through the step of finding the processing range in all three dimensions and performing scale estimation in all three dimensions. This latter alternative may save time but risks being less precise in the third dimension.

Preferably, the bounding box provides for a first processing range for rough scale estimation, the rough scale estimation then being used to calculate a second processing range for further, more refined scale estimations. The rough and refined scale estimations may be performed with LoG filters with one-, two- or three-dimensional kernels.

A preferred method of specifying this more accurate processing range using the bounding box is described below with reference to the four-step segmentation process 3000 to 6000 of FIG. 1.

Figure 2:
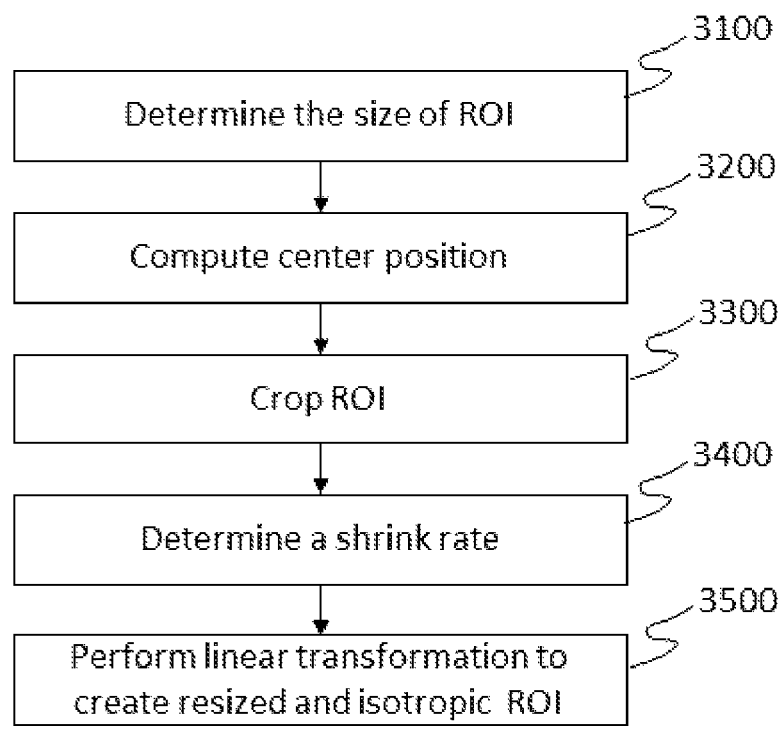
FIG. 2 is a flowchart showing a pre-processing process from the segmentation process.

The first module, pre-processing 3000, itself comprises five steps as shown in FIG. 2 and as listed below.

1. Determine a size of a region of interest (ROI) around the lymph node in step 3100. The ROI is cropped from an original image. The size of the ROI is generally determined based on a two-dimensional (2-D) bounding box input by the user in an x-y plane. If the image is a 2-D image, the ROI may be the area within the bounding box or it may (more often) be a larger area including the bounding box. If the image is a 3-D image, the ROI may be a 3-D volume defined by extrapolating the bounding box in a third dimension, or by having the user input bounding boxes in more than one (often parallel) image to build up a 3-D bounding box.

Alternatively, the ROI may be a specific size and shape around a centre point chosen by the user, the specific size and shape being determined as one likely to contain a lymph-node-sized object according to the scale of the medical image. For example, the ROI may be specified in the 2-D image as a size corresponding to 3 cm by 3 cm in the real patient around a user-inputted centre point; or the ROI may be specified in a 3-D image as a size corresponding to 3 cm by 3 cm by 3 cm in the real patient.

Figure 8:
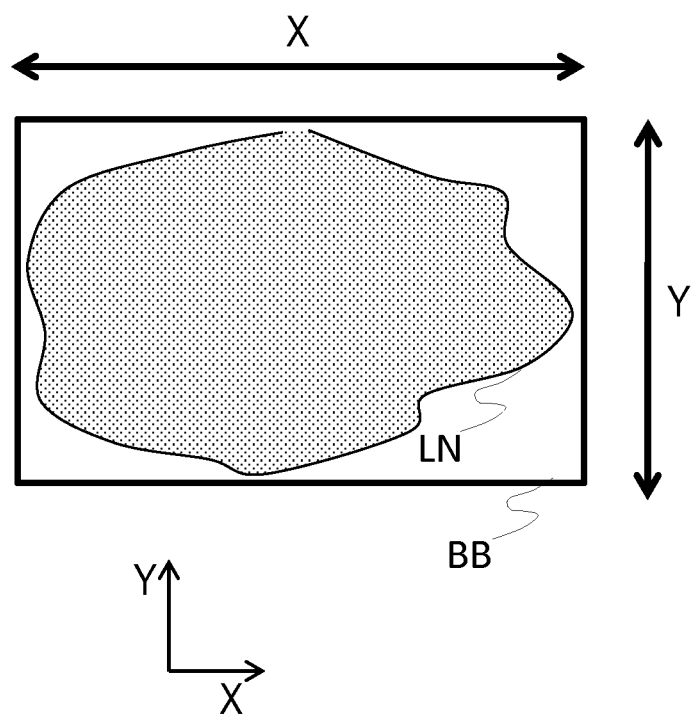
FIG. 8 shows an image of a lymph node surrounded by a user-input bounding box.

Generally, as the bounding box is input by a user to identify the position of a lymph node, the bounding box is presumed to be roughly the size of the lymph node, or just slightly larger. In the preferred embodiment, the size of the ROI is specified as having a side length approximately equal to the longer of the side lengths of the bounding box. FIG. 8 shows an example of a lymph node LN enclosed by a bounding box BB. The x-directional length and y-directional length of the bounding box are determined. For consistency and ease of explanation, the longest length of the bounding box will hereinafter be referred to as the "width" of the bounding box. In an embodiment, the measured width falls into one of five ranges, each of which gives rise to a side length of the cubic ROI measured in number of voxels and using the following formula (1):

$$\text{Size of edge of } ROI = \begin{cases} 91 & \text{if } HWidth_{BB} < 30 \\ 111 & \text{else if } HWidth_{BB} < 40 \\ 131 & \text{else if } HWidth_{BB} < 50 \\ 151 & \text{else if } HWidth_{BB} < 60 \\ 251 & \text{otherwise} \end{cases} \quad (1)$$

where $HWidth_{BB}$ is the half width of the bounding box given by equation (2) and also measured in voxels:

$$HWidth_{BB} = \frac{\text{width of bounding box}}{2} \quad (2)$$

Of course, any other suitable thresholds may be chosen based on typical bounding box sizes and accuracy of results of the associated ROIs. The system may "learn" what ROI to bounding box width associations are appropriate based on historical data.

The sizes of the ROI and the half width of the bounding box are measured in one dimension (an edge of a cube) but counted in voxels. The ROI at this stage will be larger than the bounding box but will be more likely to contain the whole lymph node even if the user input a bounding box that was not correctly surrounding the lymph node.

Thus, if the bounding box is input as having a width of 70 voxels, $HWidth_{BB}=35$ voxels according to equation (2) and the edge length of the ROI=111 voxels according to equation (1).

2. In step 3200 of FIG. 2, a centre position of the lymph node is found. The quickest way to find the centre position of the lymph node is to take the centre of the bounding box as that centre position. Alternatively, of course, if the user has indicated a centre point of the lymph node, that point can be taken as the centre position. The ROI is thus centred so that its centre matches the centre of the lymph node as far as possible.

3. The ROI is then cropped (i.e. "cut out" or "isolated") in step 3300 from the original volume image based on the dimension (of the ROI as calculated from the bounding box) and position (centre position or bounding box position) determined in steps 3100 and 3200 respectively.

4. A shrink rate is determined in step 3400 that will be applied to the cropped ROI in step 3500. This shrink rate will be used to resize the ROI (including the lymph node) and to make it isotropic. The advantage of the isotropism is that any calculation made in one dimension can be applied to the other dimensions, thus reducing the processing load. The shrink rate SR is determined from the half width of the bounding box and is given by the following formula (3):

$$SR = \begin{cases} 1 & \text{if } HWidth_{BB} < 10 \\ 3/4 & \text{else if } HWidth_{BB} < 20 \\ 2/3 & \text{else if } HWidth_{BB} < 60 \\ 1/2 & \text{otherwise} \end{cases} \quad (3)$$

5. Finally, the ROI is resized and rendered isotropic in step 3500 by the multiplication of the ROI size by the shrink rate determined in step 3400. Thus, if the bounding box is 70 voxels wide, its half-width is 35 voxels and the shrink rate is 2/3. The resized ROI thus has a side length equal to 2/3 of 111=74 voxels. The shrinking processing is for reducing resolution and thus reducing processing time). The lymph node is also shrunk during the shrinking process.

The second module 4000 of the object segmentation system comprises a scale estimation module. A LoG filter estimates the scale of the lymph node LN by using a contrast of intensity distributions between the inside and the outside of a sphere defined by a LoG operator (the size of sphere is determined by a sigma σvalue of the Gaussian filter). By contrast, object edges in the segmentation process to be described later are computed from the contrast between neighbourhood voxels.

The LoG filter processes every point in the processing range, starting in the middle and working outwards iteratively. In order to have the most efficient iterative processes, the processing ranges are preferably as small as possible (containing the smallest number of points possible) while still containing enough points that the edge of the lymph node is likely to be contained within the processing range. The way to do this is to estimate at least one of the position of the lymph node and/or the size of the lymph node. The most accurate is of course to have an accurate position and size so that the processing range may be smallest and most precise.

Scale estimation is the estimation of size and relative position of the lymph node with respect to the full image data. The process performed by the scale estimation module 4000 is divided into steps 4100 to 4900 shown in FIG. 3 and described below.

Figure 3:
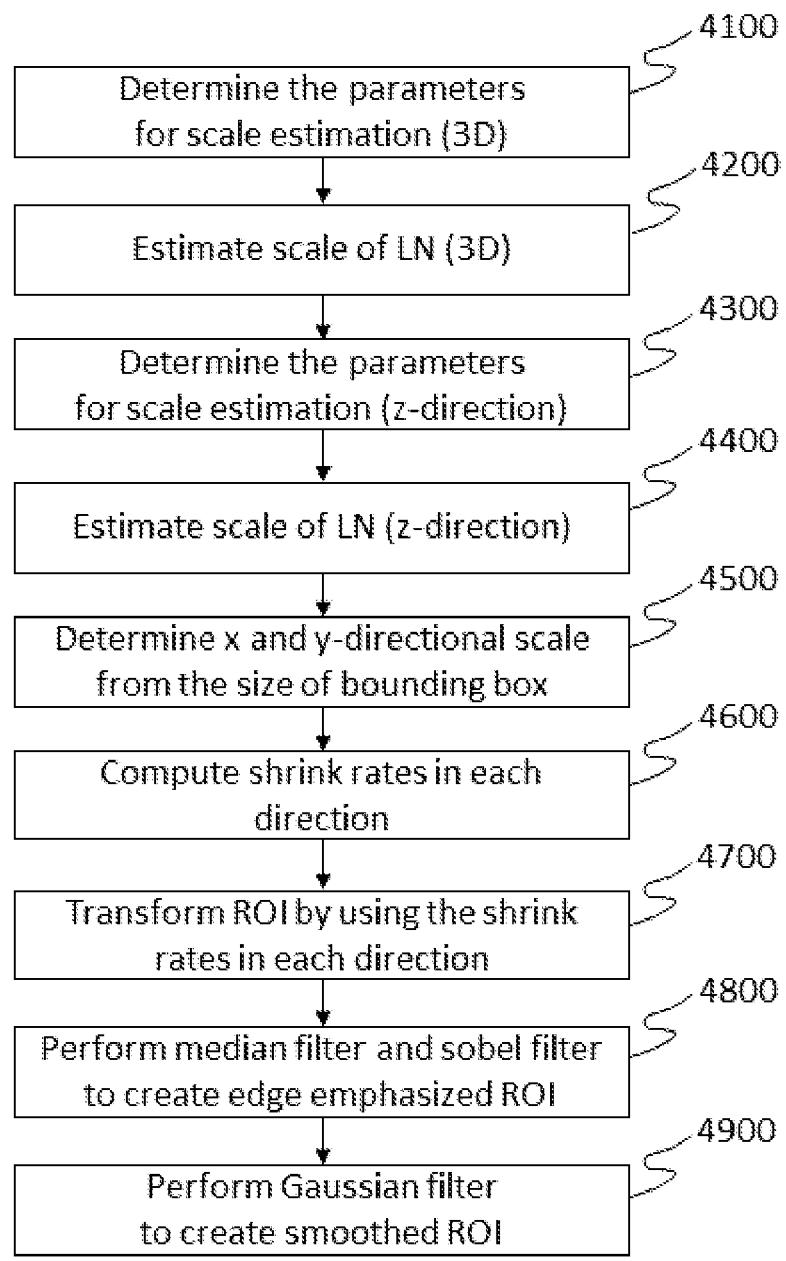
FIG. 3 is a flowchart showing a scale estimation process from the segmentation process.

Step 4100 of FIG. 3 comprises determining the parameters that will be used in the scale estimation processing. There are various types of parameter that are determined. The first type of parameter is the type that defines the points that belong to the group of points (i.e. to the lymph node) being segmented from the rest of the image. The parameters could thus be a range of intensities, texture, etc., of the pixels/voxels representing the lymph node. Other types of parameter include likely position of the lymph node with respect to the rest of the image and the likely size of the lymph node with respect to the rest of the image as mentioned above.

Another parameter to be determined in this step 4100 is a relative position of the lymph node with respect to the rest of the image. One way of finding the position of the lymph node is to find its centre point (e.g. its centre of mass). A centre point of a bounding box input by a user may be used. This is more precise, generally, than having a user specify a single centre point on a screen.

The whole of the area/volume within the ROI is processed to find the scale of the lymph node.

Figure 12:
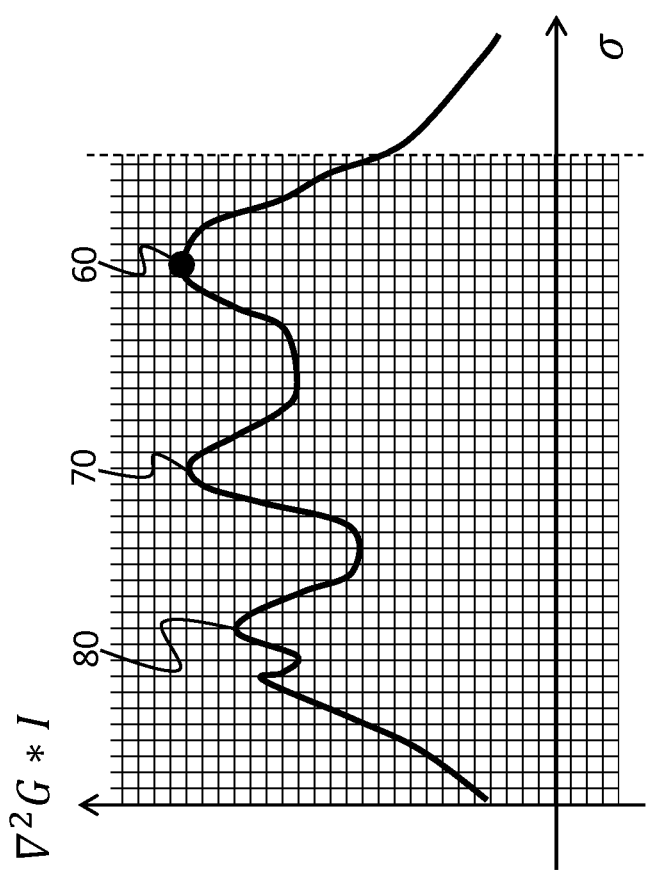
FIG. 12 is a histogram of the LoG filter showing peak values for the LoG filter over different starting position values.

The LoG filter gives rise to a histogram as shown in FIG. 12 with peaks at positions of higher change in intensity (i.e. higher contrast). Specifically, a peak means that a higher contrast exists between the inside and the outside of a sphere defined by the sigma σ value of the Gaussian filter in LoG. Such peaks occur typically at the edges of objects, but the LoG histogram will also have peaks at other points of intensity change that may be misinterpreted as edges. Alternatively, if the edges of the object are at different distances from the centre point, different peaks may be shown in the histogram, too, for different values of sigma σ, i.e. for different starting points for the LoG filter. Such peaks are shown in FIG. 12.

FIG. 12 shows the processing range (cross-hatched) on a histogram with the LoG result, $\nabla^2 G*I$, on the y-axis. G is the Gaussian filter function. σ is standard deviation. σ on the x-axis is one of the parameters in the Gaussian filter function used to define the size of the Gaussian distribution. Therefore, if σ is changed, the size of the Gaussian distribution is changed. That is to say, the scale of LoG filter (the size of LoG operator) is changed. $\nabla^2 G$ is the Laplacian-of-Gaussian operator, which is described below. How this histogram is obtained is described below with reference to step 4211 shown in FIG. 4.

Once the parameters for scale estimation have been determined, step 4200 estimates the scale of the lymph node.

A more concrete determination of the scale will be described later with reference to step 4500, but a first step involves the estimation of the scale of the lymph node in three dimensions. The details of the scale estimation processing are now described with reference to FIG. 4.

Step 4210 is an iterative filtering process (repeating steps 4211 and 4212) with a dynamic parameter (σ). In the preferred embodiments, a Laplacian-of-Gaussian (LoG) filter is used for estimating the scale of the lymph node. Step 4211 comprises performing the LoG filter on the shrunken ROI. The algorithm of the LoG filter is as follows:

first, a Gaussian filter is applied to the input image;
then, a Laplacian filter (second derivative filter) is applied to the Gaussian-smoothed image.

The above processing can be represented by $$\nabla^2(I(x,y,z)*G)=\nabla^2 G*I(x,y,z), \quad (4)$$

where I(x,y,z) is an input image, and G represents the Gaussian filter.

Figure 9:
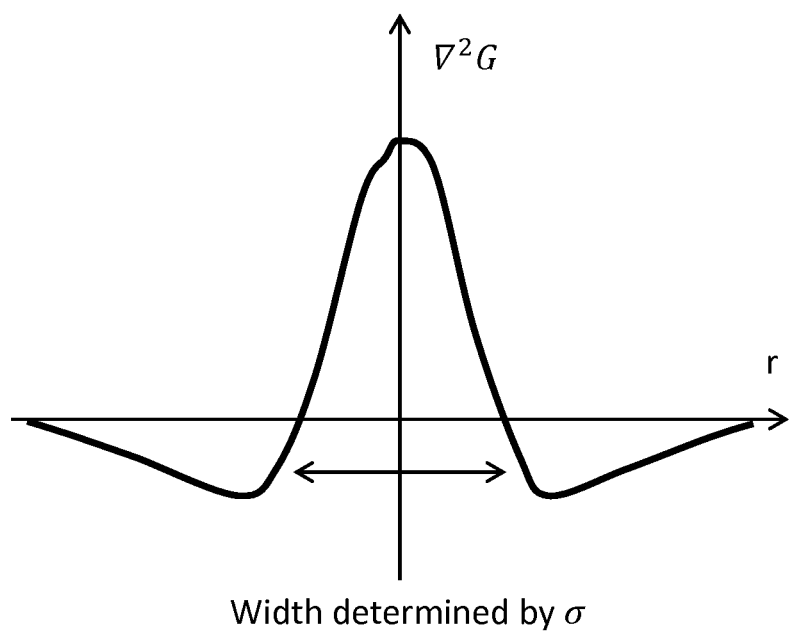
FIG. 9 shows a Laplacian-of-Gaussian kernel.

In equation (4), the right hand side means that the $\nabla^2 G$ kernel (LoG kernel) is applied to the input ROI having radius r within the image I(x,y,z). FIG. 9 shows the LoG kernel which is the second derivative of Gaussian kernel. The width (size) of LoG kernel is determined by the sigma σ value. When the LoG filter is applied to an ROI including a lymph node, the output value $\nabla^2 G$ at the centre of the lymph node takes a large value if the width σ of LoG kernel matches the width of lymph node.

In step 4212, then, the sigma σ value and the corresponding voxel position having the largest LoG value are updated if there is a LoG value which is higher than the previously recorded highest LoG value in step 4211. This highest LoG value and the associated sigma σ value are assumed to correspond to a voxel positioned in the centre of the lymph node, and thus the corrected centre position is determined.

Steps 4211 and 4212 are performed iteratively N times, N corresponding to the number of starting points in the processing neighbourhood. They apply a LoG filter iteratively while changing the σ(sigma) value, i.e. the LoG filter is applied to each point in the processing range, one after the other. The approximate scale of the lymph node can be known from the σ value which outputs the largest LoG value. The σ value is converted from a standard deviation to a voxel value by equation (5):

$$\sigma = \frac{Param_{sigma}}{4\sqrt{3}}, \quad (5)$$

where $Param_{sigma}$ represents the parameter (i.e. the distance from the centre of the ROI) that varies throughout the processing range of scale estimation which is determined in step 4100. The unit of $Param_{sigma}$ is the voxel. As described above, σ is standard deviation which is used in the Gaussian filter. Equation (5) is employed so that the σ value is obtained from a voxel value. That is to say, when the appropriate scale is searched iteratively while incrementally changing the radius of the processing range from 5, 6, 7 . . . to n voxels, such values (length measured in voxels) can be input into $Param_{sigma}$ because the equation (5) converts from the voxel value to the σ value. In the paper by A. Jirapatnakul and S. Fotin, the equation is represented as $d^2=12\sigma^2$, where "d" is the diameter of the nodule.

The value of $Param_{sigma}$ is changed incrementally, one by one in value, in an iterative process. Therefore, the number of iterations is determined in dependence on the extent of the processing range of scale estimation.

After finishing the iterative processing 4210, the system can determine the σ value and the voxel position which together have the largest LoG value (i.e. a peak in the histogram of FIG. 12) and this position is presumed to be the scale of the lymph node.

Figure 4:
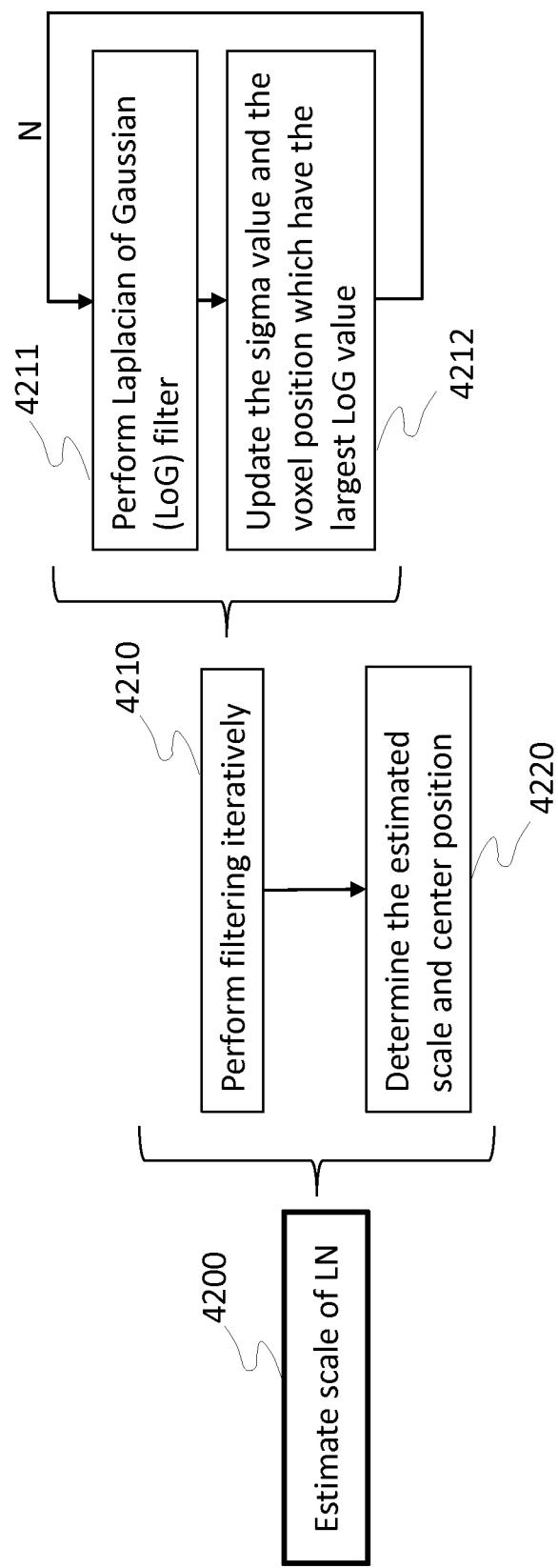
FIG. 4 is a flowchart showing the use of a LoG filter in the scale estimation process.

In step 4220 of FIG. 4, the scale and/or the centre position of the lymph node is determined from the results of the step 4210. The scale in this case may be the radius of the lymph node and so the sigma value outputted from step 4210 is converted into a radius value, giving an estimated scale for the lymph node in 3-D. The voxel position which has the largest LoG value becomes the centre of the lymph node. The determined scale and/or centre of lymph node may then be used in the next steps of scale estimation shown in FIG. 3.

According to a further embodiment, if the size of the lymph node cannot be estimated within the defined processing range, it is assumed that either the processing range is too small or is incorrectly positioned. Thus, the scale estimation processing is performed again over a larger range. There are several ways in which the range may be increased and a selection of one or more of these ways may be made based on a (logged) history of other similar processes or on further user input. For example, if it is found that a bounding box is typically made smaller than expected, a way of increasing the processing range or processing neighbourhood may be selected that starts not with a half width of the bounding box, but with a 60 or 70% or other percentage width of the bounding box.

Returning to FIG. 3 and the scale estimation process, step 4300 comprises determining the parameters for z-directional scale estimation processing in the case of a 3-D image.

The bounding box that is used to estimate the scale of the lymph node in the x- and y-directions is of course only input by the user in the x-y plane and so the scale of the lymph node in the z-direction is not alluded to by the user's input. Thus, further steps may be performed to find the scale estimation of the lymph node in the z-direction (also referred to as the third dimension).

One way to estimate the scale in the z-direction is to use the scale estimation of the x-y plane and extrapolate it to the z-direction so that a circle, for example, becomes a sphere. This works for a lymph node shaped as that shown in FIG. 10B. In this figure, the arrow 100 shows the radius of the scale estimated using the extrapolation from the x-y plane scale estimation.

Figure 10A:
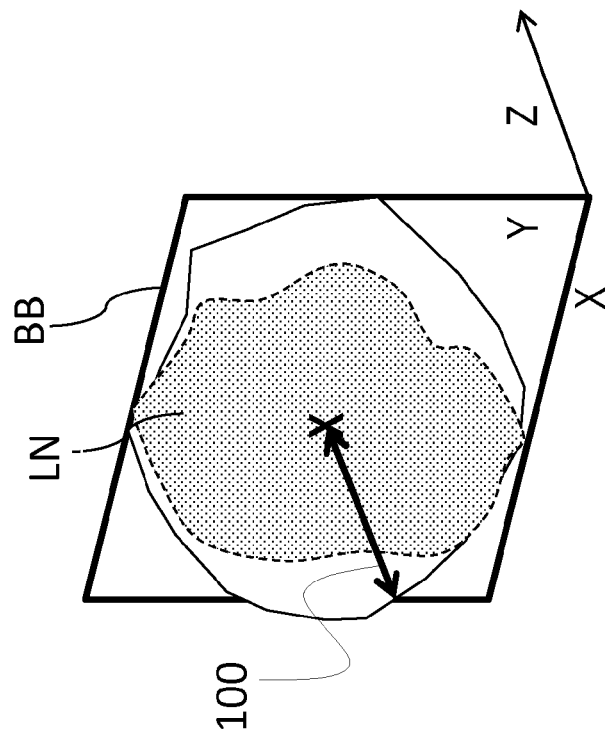
FIGS. 10A and 10B are schematic diagrams of estimated scales of a lymph node in three dimensions, the lymph node in FIG. 10B being a transformed version of the lymph node in FIG. 10A.

A potential problem with this lies in an example where the lymph node is significantly longer in the z-direction than in either the x- or y-directions, such as that shown in FIG. 10A.

A second way to estimate the scale in the z-direction is to use the processing range determined for the x-y plane and to perform the scale estimation (e.g. using the LoG filter) in the z-direction based on this processing range. Again, if the lymph node is substantially spherical, this method would work efficiently.

Again, however, the potential problem with this second method is present in the case where the lymph node is significantly longer in the z-direction (or, indeed, significantly shorter) than the processing range used.

A preferred embodiment therefore estimates the scale in the z-direction with a different starting point from the scale estimation in the x- and y-directions. The preferred embodiment performs the steps of scale estimation for the z-direction as were performed for the x- and y-directions, starting with finding the scale estimation parameters in the z-direction.

The parameters to be determined in step 4300 are the same as those of step 4100, but in the z-direction. The equations for determining each parameter are almost same as in step 4100. The differences from the equations used to estimate the scale using the boundary shape are that the "HWudtg$_{BB}$·SR" is replaced with the estimated scale of the lymph node output in step 4200 (which should be a more precise estimate of the scale). In addition, the processing neighbourhood for the centre of the lymph node is shifted to (0, 0, modified z) and scale estimation processing is computed only in the z-direction in this step. The "modified z" processing range is given by $$\text{Scale}_{in\ 3D\ space} - \text{Param}_{shifting} \leq \text{modified } z \leq \text{Scale}_{in\ 3D\ space} + \text{Param}_{shifting} \quad (6)$$

where Scale$_{in\ 3D\ space}$ is the estimated 3-D scale of the lymph node from step 4200 as described above. In equation (6), Param$_{shifting}$ is recalculated by replacing HWidth$_{BB}$·SR (used for estimating scale based on the boundary shape) with Scale$_{in\ 3D\ space}$.

Step 4400 of FIG. 3 comprises the estimation of the z-directional scale of the lymph node possibly including the modification of the centre position of the lymph node in the z-direction. The algorithm of this step is almost same as in step 4200. In z-directional scale estimation and z-directional centre position modification, the system uses a z-directional (a one-dimensional) LoG kernel in the LoG calculation. Specifically, the LoG kernel in step 4200 is a 3-dimensional kernel whereas the LoG kernel in this step is 1-dimensional kernel.

To the end of step 4200, therefore, the scale of the lymph node is estimated in all three dimensions as being equal (based on the longest width of the bounding box). At the end of step 4400, the scale in the z-direction has been more accurately and individually estimated based on the 3-D scale estimation. A further (alternative or additional) step is performed to obtain individual, more accurate measurements in each direction individually. Specifically, in step 4500, the scales of the lymph node in each direction are more concretely determined. Here, "each direction" means individual x, y and z-directions which are different from each other and from the scale estimated in step 4200 because they have been individually calculated, further to being computed in 3-dimensional space as in step 4200. The z-directional scale has thus been computed as described with reference to step 4400 and in this step 4500, the x-directional scale and y-directional scale are defined by the length of bounding box in x-direction and the length of bounding box in y-direction, respectively. The processes described above are thus applied independently to each direction, rather than the longest length of the bounding box being used for both x- and y-directions.

Instead of determining the initial 3-D estimate in step 4200, the scales of the x- and y-directions can be estimated individually in the first instance using one-dimensional LoG kernels and a suitable average (or other function) of the estimated scales may be used to estimate the scale in the z-direction. Either way, the intention is to provide a starting point from which to estimate the scale of the lymph node in the z-direction, taking into consideration the fact that the bounding box is not drawn in that direction. Yet alternatively, a two-dimensional LoG kernel may be used to obtain a two-dimensional scale estimation of the lymph node, this scale estimation then being used to give a processing range for further, more refined scale estimations in one, two or three dimensions.

A shrink rate is then computed in each direction in step 4600. The shrink rates in each direction ($SR_{each\ direction}$) is computed by:

$$SR_{each\ direction} = \frac{Scale_{3D\ space}}{Scale_{each\ direction}}, \quad (7)$$

where $Scale_{each\ direction}$ is each directional scale determined in step 4400 or step 4500, measured in voxels. The shrink rate in each direction is calculated in every direction independently such that the system obtains three shrink rates, x-, y- and z-directional shrink rates. The intention with this manipulation is to create a non-isotropic lymph node that can be manipulated (by the segmentation process, region-growing and level-set) in all directions in the same way but that can be re-grown with the individual shrink rates after such manipulation to obtain the original lymph node scales.

Equation (7) is applied in the case that the scale in each direction (output of step 4500) is larger than the scale in 3D space (output of step 4200). If the scale in each direction is smaller than the scale in 3D space, the shrink rates all become "1.0" such that the individual scales are the same as the overall estimated scale. Conversely, if the scale of one dimension is found (e.g.) by a user inserting a bounding box or boundary shape around the object and this scale is found to be larger than the three-dimensional scale estimation, only this one specific dimension will have the shrink rate applied to it.

Step 4700 of FIG. 3 comprises the transformation of the ROI using the shrink rates in each direction calculated in step 4600. The width, height and depth (i.e. the three dimensions) of the ROI to be transformed are multiplied by their respective shrink rates. Then, the linear transformation method is performed by following the modified width, height and depth. FIG. 10A shows the lymph node LN as it might appear in the body and in the 3-D image data. The shrinking transformation using the estimated scales and respective shrink rates is applied to give the non-isotropic but substantially spherical lymph node of FIG. 10B. In these figures, the shaded region LN is the lymph node in the x-y plane with a scale as estimated in step 4200 using the bounding box BB. The longer arrow 110 represents the scale estimated in the z-direction (step 4400). In this case, the scale estimated in the z-direction is larger than that estimated in 3D space (step 4200). Therefore, the ROI is shrunk more in the z-direction to give the lymph node an isotropic scale (but non-isotropic voxels) shown in FIG. 15B. The long shape of the lymph node in the z-direction is shrunk most in the z-direction to approximate a sphere because a sphere shape is convenient for image processing. The reason for this transformation is that once the scale estimation has been performed, the image is prepared for segmentation. Contrary to the state of the art, the method of the present embodiments does not use the information of a centroid of the object in transformation processing. Rather, the currently-described method transforms the space containing the object from Cartesian to modified Cartesian, which does not need the information of a space centroid.

In other words, the currently-described method performs "non-isotropic transformation" from isotropic space to non-isotropic space.

Before this transformation, the scale estimation method deals with the isotropic image which is create in preprocessing. During the transformation, the pitch between each voxel is changed from isotropic to non-isotropic. Thus, the transformation transforms the shape (i.e. the surface) of the object to make segmentation easier. A first dimension of the lymph node might have the original image pixel pitch; the second might have the pixel pitch reduced by a first rate and the third might have the pixel pitch reduced by a second rate, or even enlarged by another rate. The result, though, is a regular, 3 dimensional but non-isotropic shape.

This transformation may alternatively be applied to two dimensions to segment the object in a two dimensional image.

FIG. 10A shows an example of a shape of object which has a long shape in the z-direction. The correct scale in z-direction is larger than the scale estimated in 3D space based on the input boundary shape BB. When the object in FIG. 10A is inputted into an image processor for segmentation, the image processor cannot perform correct segmentation in z-direction because the employed segmentation method takes into account the constraint condition using the scale estimated in 3D space.

Figure 10B:
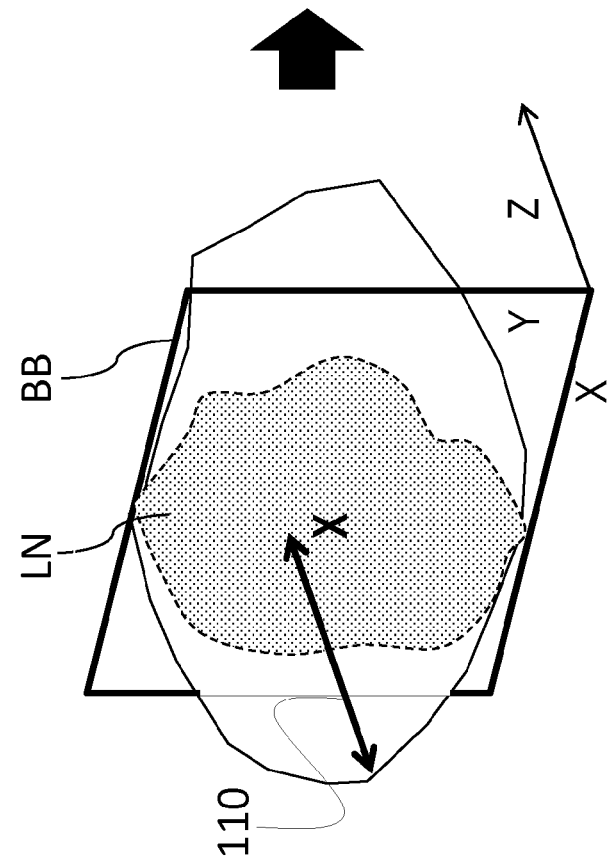
Figure 11B:
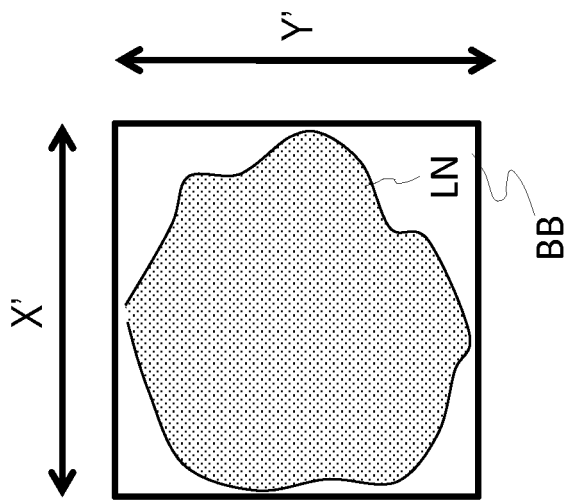
FIGS. 11A and 11B are schematic diagrams of estimated scales of a lymph node in two dimensions, the lymph node in FIG. 11B being a transformed version of the lymph node in FIG. 11A.
Figure 11A:
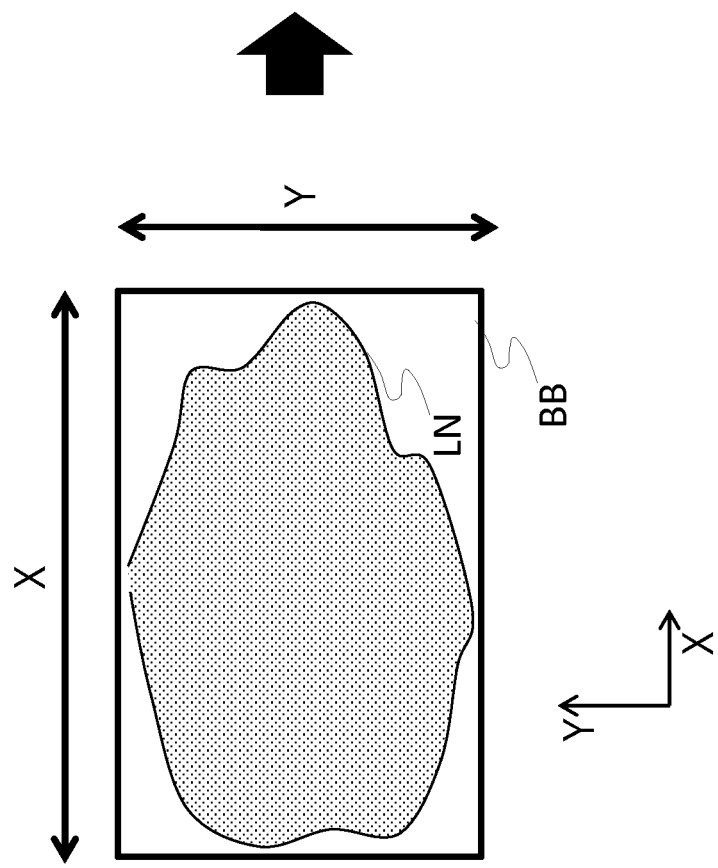

In order to obtain a correct segmentation in the z-direction, first, a z-directional scale is estimated as described with reference to steps 4300 and 4400. Then, the function to transform a lesion by following the estimated z-directional scale is added. FIG. 10B represents the transformed object. The transformed lesion is approximated to a spherical shape. This transformation means that the simple constraint condition can be used in the segmentation (if the segmentation method deals with a specifically-shaped lesion, the constraint condition becomes more complex because the segmentation method has to take into account the scales in all direction). Thus, the segmentation accuracy can be improved.

The solution to segment a specifically-shape lesion is described with reference to step 4700 above.

Step 4800 of FIG. 3 comprises the creation of the edge-emphasized ROI which is used in the later steps. First, the system applies a median filter (a smoothing filter) to the ROI created in the step 4700. Then a Sobel filter (a first derivative filter to emphasize an edge in an image) is applied to the median-filtered ROI.

Finally, step 4900 comprises the creation of a smoothed ROI which is used in the later steps. Here, the system applies a Gaussian filter (another smoothing filter) to the ROI created in the step 4700.

Figure 5:
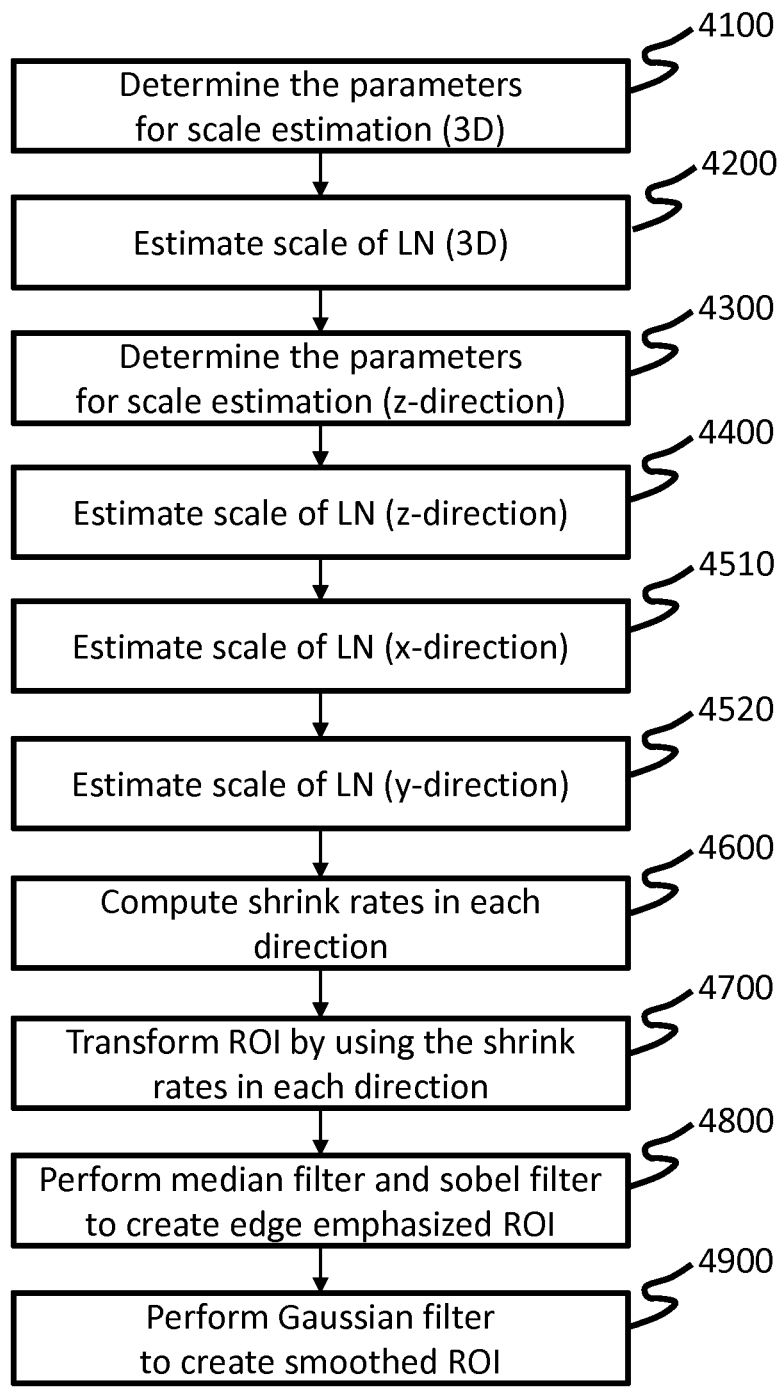
FIG. 5 is a flowchart showing scale estimation of a 3-D object.

In the scale estimation process shown in FIG. 3, step 4500 of determining the x- and y-directional scales from the width and height of the bounding box can be modified. By replacing the LoG kernel to an x- or y-directional kernel and modifying the processing area from (0,0,z) to (x,0,0) or (0,y,0), the x- and y-directional scales can be estimated in the same way as the z-direction. Such a process is shown in FIG. 5, where step 4500 is replaced with two steps, 4510 and 4520, of estimating the scales in each of the x- and y-directions respectively.

Figure 6:
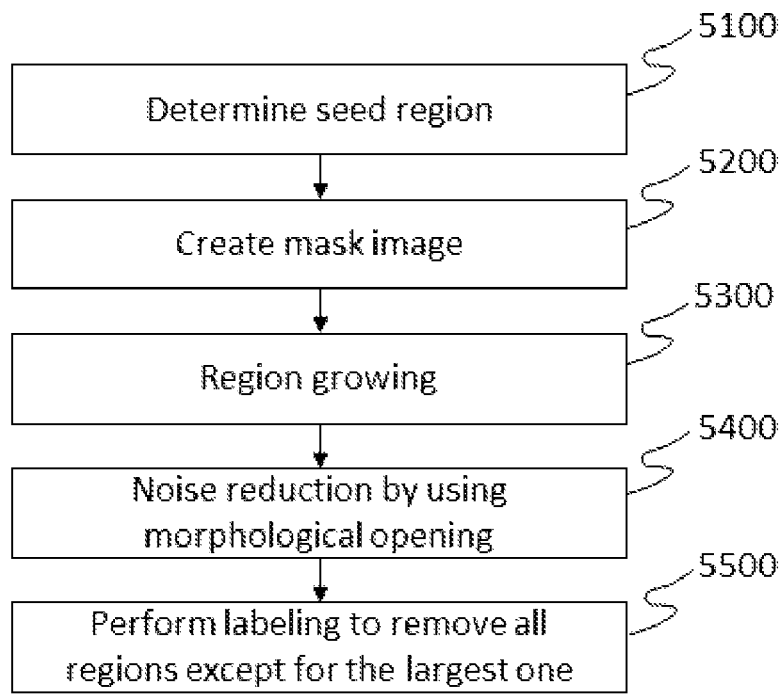
FIG. 6 is a flowchart showing a rough segmentation process from the segmentation process using a region-growing method.

FIG. 6 shows the processing flow in a rough segmentation (step 5000 in FIG. 1) module, specifically the "region growing" process. As mentioned above, scale estimation is useful in object segmentation because it defines starting points and boundaries for the region growing process. The segmentation using the region growing process is performed over all points in a processing range derived from the scale estimation to find points (or voxels) with the characteristics chosen to define the lymph node.

Each processing step in the rough segmentation process will now be described.

Step 5100 comprises the determination of the positions of at least one seed point which is/are the starting point/s of a "region growing" processing. The positions of seed points are set up on the surface of a sphere located at the centre of the imaged lymph node. The radius of the "seed" sphere is determined by $$\text{Radius} = \frac{Scale_{in\ 3D\ space}}{5}. \quad (8)$$

In other words, the sphere at the centre of the lymph node on which seed points are specified is, in this embodiment, a fifth of the size of the estimated scale of the lymph node as estimated during the scale estimation processing discussed with respect to steps 4200 in FIG. 3. Of course, other embodiments will have other ways of determining the radius of the sphere. It may be a different fraction of the estimated 3-D scale of the lymph node or it may be an arbitrary size based on likely scales of lymph nodes or even based on the individual scale results for the different dimensions (such as their average or some other function). Alternatively, the seed points may be specified not at positions on the surface of a sphere, but at a centre point either as estimated based on the position of the bounding box or as corrected using the LoG filter. Yet alternatively, the seed points will be points having a specific parameter value, such as a specific voxel intensity value.

Once the seed points have been specified, a mask image is created in step 5200 to constrain excessive region expansion. The mask image is created by using low/high thresholds which are hard-coded in the program. For example, the high threshold is 200 and the low threshold, −20 in the Gaussian-filtered image. These values are determined from historical data. In general, most organs and tissues in a body satisfy the above range (from 200 HU to −20 HU in CT value (Hounsfield Unit)).

Alternatively, for example, the mask may be specified by referring to a histogram of voxel intensity, with intensities that fall below a certain value being a low threshold below which voxels having that intensity are outside the mask. The same may be done for high intensity. Alternatively or additionally, the mask may be a shape slightly larger than the estimated scale of the lymph nodes so that voxels with similar properties to the seed points but that lie outside the expected lymph node shape are not included in the segmented region.

In step 5300, the region-growing method proper is performed. In a preferred embodiment, the edge-emphasized ROI created in step 4800 is used as an input image to the region-growing processing. That is to say, the seed points are installed within the edge-emphasized ROI. The regions are then grown from these seed points to adjacent points depending on a region membership parameter. The parameter could be, for example, pixel intensity, grey level texture, or colour.

Starting with the seed points, the voxels around the seed points (the "target" voxels) are included in the region if they satisfy the region membership parameter and if they are not outside the thresholds or the mask.

The judgement of whether a target voxel should be included in the region or not is defined using one threshold in the equation below, though further thresholds will be derivable by the skilled person. The threshold (Threshold$_{edge}$) is computed using equation (9):

$$\text{Threshold}_{edge} = 5.0 \times V_{average}, \quad (9)$$

where $V_{average}$ is the average edge value in the sphere region which is defined in step 5100. If an edge value (the voxel value of the Sobel-filtered ROI) of target voxel is lower than the upper threshold, the target voxel is included in the segmented region.

Step 5400 comprises the application of morphological opening to remove any noise within the segmented region. Specifically, the morphological opening is applied to the binary ROI created by step 5300.

With the use of plural seed points, there is the possibility that more than one region in fact grow in parallel. Step 5500 comprises applying labelling processing (also known as connected-component labelling) to remove all regions except for the largest one in the binary ROI created in step 5400. A labelling process labels each region in an image. Segmentation methods often output binary images. In the binary image, the system cannot understand how many regions exist, how many pixels (or voxels) the each region has and so on because the binary image has only two values, "foreground" or "background". That's why the labelling processing is performed. A system can then obtain the number of regions, the number of voxels of each region and so on.

Figure 7:
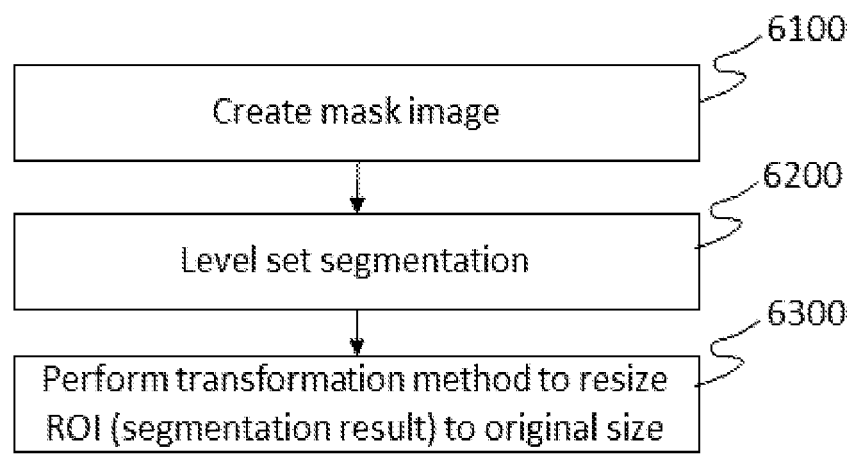
FIG. 7 is a flowchart showing segmentation refinement from the segmentation process using level set segmentation.

FIG. 7 shows the processing flow of the refinement process, which is step 6000 in FIG. 1. The main technology of the refinement is the level set method as described above. Each step of the refinement process is now described.

First, in step 6100, a mask image is created to constrain excessive region expansions. The mask image is created by using low and high thresholds, i.e. minimum and maximum Gaussian filtered values (low: −20; high: 200), which are hard-coded in the program. The parameters of the mask are changed depending on the estimated scale of the lymph node. The estimated scale described with reference to FIG. 4 is used for defining the mask region. Specifically, the mask region is created by using the low and high thresholds (low: −20, high: 200) and the estimated scale (voxels that have a longer distance than the "estimated scale*2" from the corrected central point are regarded as "not processing regions").

Next in in step 6200, the level set segmentation proper is performed. The details of a possible level set algorithm is described in the paper "Level set method 1$^{st}$ ed." published by J. Sethian et al in 1996. In a preferred embodiment, the rough segmentation result of step 5500 is used as the image to determine the initial zero level set (i.e. the "front") in level set processing. Specifically, the zero level sets that define the initial interface are set on the borderline of the segmented region created in step 5500. At each iteration, the interface changes according to forces defined by the segmented surface of the lymph node. A narrow band technique is employed in the iterative processing of level set, which means that at least some of the iterated processes are restricted to a thin band of active voxels immediately surrounding (or immediately adjacent) the interface. In this step, the system uses level set computation to obtain the binary image that represents the segmented region (lymph node) and the background (other tissues). For example, the voxel value "1" represents the lymph node region, the voxel value "0" represents the other tissues in binary image. Voxels with value "1" are thus segmented from the rest. After the level set computation, in step 6300, a transformation method is performed to resize the ROI including the region segmented by step 6200 from its shrunken size (in step 3500) to the original resolution. This is to overlap the segmentation result on the original input image and to display it. The segmentation result obtained in step 6200 is resized by a transformation method such as nearest neighbour interpolation. The inverse transform to return the regularly-shaped object to its original shape is also applied. The pitch between the pixels is returned to the isotropic pitch of the original image and the lymph node is segmented and extracted from the rest of the image in its original shape.
Modifications Instead of using a LoG filter for the scale estimation, other filters can be used, such as a Hough transform. The use of the Hough transform enables the detection of the sphere using the intensity information at the voxels that are located within a distance r (a parameter related to radius) from the centre of the lymph node. Thus, rather than changing σ and applying the LoG filter, the Hough transform can be applied with a changing r value.

The present invention is most usefully implemented using a processor such as a personal computer (PC) and a computer program may be stored in a non-transitory format on a storage medium. The processor could be in any image-processing device including an image-processing device forming part of a medical imaging modality such as an X-ray or CT machine.

Figure 13:
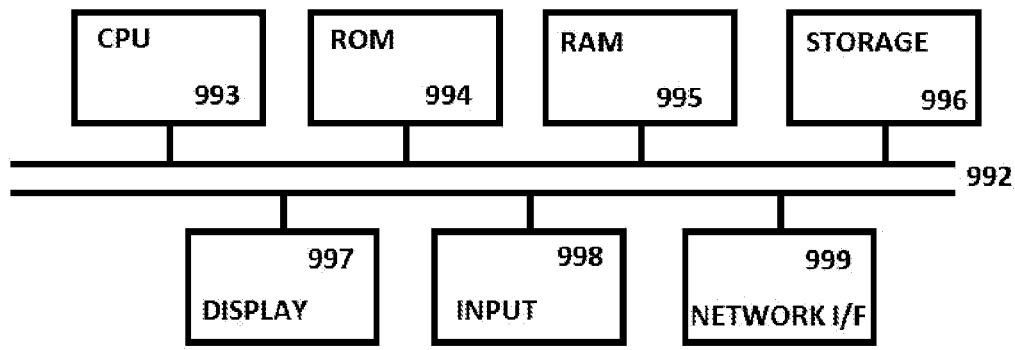
FIG. 13 is a diagram showing a computing device which may be used to implement a method of an embodiment.

FIG. 13 is a block diagram of an exemplary computing device, such as personal computer, which may be used to implement a method of embodiment. The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of computing devices. Optionally, the computing device also includes Read Only Memory 994, one or more input mechanisms such as keyboard and mouse 998, and a display unit such as one or more monitors 997. The components are connectable to one another via a bus 992.

The CPU 993 is configured to control the computing device and execute processing operations. The RAM 995 stores data being read and written by the CPU 993. The storage unit 996 may be, for example, a non-volatile storage unit, and is configured to store data.

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network interface (network I/F) 999 is connected to a network, such as the Internet, and is connectable to other such computing devices via the network. The network I/F 999 controls data input/output from/to other apparatus via the network.

Other peripheral devices such as microphone, speakers, printer, power supply unit, fan, case, scanner, trackerball etc. may be included in the computing device.

A method of an embodiment may be carried out on a computing device such as that illustrated in FIG. 13. Such a computing device need not have every component illustrated in FIG. 13, and may be composed of a subset of those components. A method of an embodiment may be carried out by a single computing device in communication with one or more data storage servers via a network. The computing device may be a data storage itself. A method of an embodiment may be carried out by a plurality of computing devices operating in cooperation with one another.

Figure 14:
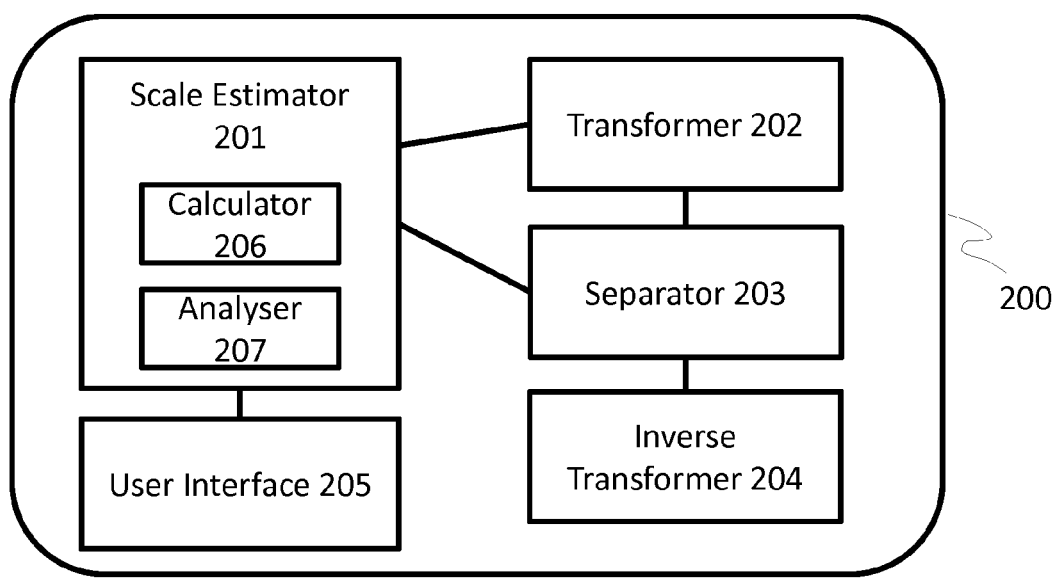
FIG. 14 is a diagram of an image-processing apparatus according to an aspect of an embodiment.

FIG. 14 shows an image-processing apparatus 200 for segmenting an object from a three-dimensional image according to an aspect of an embodiment. The image-processing apparatus 200 may comprise: a scale estimator 201 for performing scale estimation on the object in three dimensions based on a surface of the object in an original volume; a transformer 202 for transforming the surface of the object to render a regularly-shaped object based on the scale estimation; a separator 203 for separating the regularly-shaped object from the surrounding volume; and/or an inverse-transformer 204 for inverse-transforming the regularly-shaped object to obtain the original object.

The image-processing apparatus 200 may comprise a user interface 205 for inputting a boundary shape around the object. Further, the scale estimator 201 may comprise: a calculator 206 for calculating a processing range around the object based on the input boundary shape; and an analyser 207 for analysing all points within the processing range to obtain a scale estimate of the object.

The separator 203 may be configured to base the separation on the scale estimation, and may be further configured to base the separation on the boundaries defined in the scale estimation, and/or on points in a processing range derived from the scale estimation.

The invention claimed is:

1. A method for object segmentation comprising the steps of:
    obtaining a scale estimation of an object in three dimensions based on a surface of the object in an original volume;
    transforming the object to render a shrunk object based on the scale estimation, wherein the shrunk object is the object shrunk in at least one of the three dimensions;
    separating the shrunk object from a surrounding volume which surrounds the shrunk object; and
    inverse-transforming the separated shrunk object to obtain the original object.

2. A method according to claim 1, wherein obtaining the scale estimation comprises:
    obtaining a further scale estimation in at least one of the three dimensions.

3. A method according to claim 2, further comprising:
    inputting a two-dimensional boundary shape around the object;
    specifying a two-dimensional first processing range based on the input boundary shape;
    applying a Laplacian-of-Gaussian filter with a two-dimensional kernel to the first processing range to estimate a two-dimensional scale of the object in first and second dimensions (x, y); and
    applying a Laplacian-of-Gaussian filter with a one-dimensional kernel in the third dimension (z) within a second processing range based on the scale estimated for the object in the first and second dimensions (x, y).

4. A method according to claim 3, further comprising:
    applying a Laplacian-of-Gaussian filter with a one-dimensional kernel in each of the first and second dimensions to obtain the further scale estimation in each of the first and second dimensions.

5. A method according to claim 3, further comprising:
    obtaining the second processing range with a modified centre position (0,0,modified z) based on the scale estimation of the object in three dimensions according to the following formula:

$$\text{Scale}_{in\ 3D\ space} - \text{Param}_{shifting} \leq \text{modified } z \leq \text{Scale}_{in\ 3D\ space} + \text{Param}_{shifting}$$

wherein:

$\text{Scale}_{in\ 3D\ space}$ is the obtained scale estimation of the object in three dimensions, and $\text{Param}_{shifting}$ is a parameter based on the input boundary shape.

6. A method according to claim 1, wherein obtaining the scale estimation of the object in three dimensions comprises:
applying a Laplacian-of-Gaussian filter with a three-dimensional kernel to the object.

7. A method according to claim 6, further comprising:
inputting a two-dimensional boundary shape around the object in a first and a second dimension;
specifying a three-dimensional first processing range based on the boundary shape in the first and second dimensions;
applying a Laplacian-of-Gaussian filter with a three-dimensional kernel to estimate a three-dimensional scale of the object based on the three-dimensional first processing range.

8. A method according to claim 7, further comprising:
applying a Laplacian-of-Gaussian filter with a one-dimensional kernel in each of the first and second dimensions to obtain the further scale estimation in each of the first and second dimensions.

9. A method according to claim 1, wherein obtaining the scale estimation of the object in three dimensions comprises:
applying a Laplacian-of-Gaussian filter with a one-dimensional kernel to the object in each of the three dimensions.

10. A method according to claim 1, wherein transforming the object comprises transforming each dimension of the object independently from others of the dimensions.

11. A method according to claim 10, wherein a different function is applied to each dimension of the object.

12. A method according to claim 1, wherein transforming the object comprises:
obtaining a three-dimensional scale estimation of the object $\text{Scale}_{3D\ space}$;
obtaining a one-dimensional scale estimation for each dimension of the object $\text{Scale}_{each\ direction}$; and
multiplying a respective shrink function $SR_{each\ direction}$ with each respective one-dimensional scale estimation for each of at least one dimension of the object according to the following formula:

$$SR_{each\ direction} = \frac{\text{Scale}_{3D\ space}}{\text{Scale}_{each\ direction}}.$$

13. A method according to claim 12, wherein if the one-dimensional scale estimation in each dimension is smaller than the three-dimensional scale, the shrink functions are all 1.0.

14. A method according to claim 12, wherein if a one-dimensional scale estimation in a specific dimension as obtained by a boundary shape input by a user is larger than the three-dimensional scale estimation, the shrink function is applied only to that specific dimension.

15. A method according to claim 12, wherein inverse-transforming the separated shrunk object comprises multiplying an inverse of the shrink function to each respective dimension of the object.

16. A method according to claim 1, wherein the separating of the shrunk object from the surrounding volume is based on the scale estimation.

17. A method according to claim 16, wherein the separating of the shrunk object from the surrounding volume uses boundaries defined in the scale estimation.

18. A method according to claim 16, wherein the separating of the shrunk object from the surrounding volume uses points in a processing range derived from the scale estimation.

19. A method according to claim 1, wherein transforming the object comprises transforming a pitch of voxels within the object.

20. A method according to claim 1, wherein transforming the object comprises creating the shrunk object with a single dimension parameter for the separation process.

21. A method according to claim 20, wherein the single dimension parameter is one of a group containing a diameter and a radius of the shrunk object.

22. A method according to claim 1, wherein transforming the object comprises transforming the object in isotropic space into a sphere in non-isotropic space.

23. A method according to claim 1, wherein the shrunk object is a substantially spherical.

24. A method according to claim 1, wherein obtaining the scale estimation comprises:
inputting a boundary shape around the object in first and second dimensions (x, y);
calculating a first processing range based on the boundary shape;
applying a Laplacian-of-Gaussian filter with a three-dimensional kernel to each point in the first processing range to obtain an estimation of the scale of the object in three dimensions;
applying a Laplacian-of-Gaussian filter with a one-dimensional kernel to each point in a second processing range based on the estimation of the scale of the object in three dimensions to obtain an estimation of the scale of the object in a third dimension (z) that is other than a dimension in which the boundary shape exists (x, y);
applying a Laplacian-of-Gaussian filter with a one-dimensional kernel to each point in a third processing range calculated based on a size of the boundary shape in the first dimension (x) to obtain a further estimation of the scale of the object in the first dimension (x); and
applying a Laplacian-of-Gaussian filter with a one-dimensional kernel to each point in a fourth processing range calculated based on a size of the boundary shape in the second dimension (y) to obtain an estimation of the scale of the object in the second dimension (y);
outputting a scale estimation of the object comprising individual scale estimations for each dimension (x, y, z) of the object.

25. A method according to claim 24, further comprising:
obtaining the second processing range with a modified centre position (0,0,modified z) based on the scale estimation of the object in three dimensions according to the following formula:

$$\text{Scale}_{in\ 3D\ space} - \text{Param}_{shifting} \leq \text{modified } z \leq \text{Scale}_{in\ 3D\ space} + \text{Param}_{shifting}$$

wherein:

$\text{Scale}_{in\ 3D\ space}$ is s the obtained scale estimation of the object in three dimensions, and $\text{Param}_{shifting}$ is a parameter based on the input boundary shape.

26. A method according to claim 1, wherein the object is one of a group comprising at least a lymph node, a lesion, a tumour and a nodule.

27. A method according to claim 1, wherein transforming the object is performed so that the shrunk object is approximated to a spherical shape.

28. A method according to claim 1, further comprising: obtaining the inverse-transformed object as the original object.

29. A method according to claim 1, wherein the separating the shrunk object comprises performing a level-set segmentation.

30. A method according to claim 29, wherein the level-set segmentation is preformed based on a result of a region growing segmentation.

31. A method of segmenting an object from an image comprising:
receiving the image;
performing scale estimation of the object including:
inputting a boundary shape around the object,
defining a processing area based on the boundary shape, and
performing a scale estimation within the processing area to obtain an estimated scale of the object;
transforming a shape of the object into a shape approximated to a spherical shape based on the estimated scale of the object;
rough segmentation for estimating the shape approximated to a spherical shape based on the estimated scale of the object;
fine segmentation comprising a level-set method for refining the shape of the object based on the rough segmentation result;
inverse-transforming the refined shape into its original volume; and
extracting the refined shape of the inverse-transformed object from the image.

32. A method according to claim 31, wherein the object is one of a group comprising at least a lymph node, a lesion, a tumour and a nodule.

33. An image-processing apparatus for segmenting an object from a three-dimensional image, the apparatus comprising:
at least one processor; and
memory,
the at least one processor and the memory being operatively coupled to function as:
a scale estimator for performing scale estimation on the object in three dimensions based on a surface of the object in an original volume;
a transformer for transforming the object to render a shrunk object based on the scale estimation, wherein the shrunk object is shrunk in at least one of the three dimensions;
a separator for separating the shrunk object from a surrounding volume which surrounds the shrunk object; and
an inverse-transformer for inverse-transforming the separated shrunk object to obtain the original object.

34. An image-processing apparatus according to claim 33, further comprising a user interface for inputting a boundary shape around the object, wherein the scale estimator comprises:
a calculator for calculating a processing range around the object based on the input boundary shape; and
an analyser for analysing all points within the processing range to obtain a scale estimate of the object.

35. An image-processing apparatus according to claim 33, wherein the separator is configured to base the separation on the scale estimation.

36. An image-processing apparatus according to claim 35, wherein the separator is configured to base the separation on the boundaries defined in the scale estimation.

37. An image-processing apparatus according to claim 35, wherein the separator is configured to base the separation on points in a processing range derived from the scale estimation.

38. An image-processing apparatus for segmenting an object from a three-dimensional image, the apparatus comprising:
at least one processor; and
memory,
the at least one processor and the memory being operatively coupled to function as:
a scale estimator for performing scale estimation on the object in three dimensions based on a surface of the object in an original volume;
a transformer for transforming the object to render a shrunk object based on the scale estimation, wherein the shrunk object is the object shortened in at least one dimension of the three dimensions;
a separator for separating the shrunk object from a surrounding volume which surrounds the shrunk object; and
an inverse-transformer for inverse-transforming the separated shrunk object to obtain the original object.

39. A method for object segmentation comprising the steps of:
obtaining a scale estimation of an object in three dimensions based on an intensity distribution of the object in an original volume;
transforming a scale of the object to render a sphere-like object based on the scale estimation;
separating the sphere-like object from a surrounding volume which surrounds the sphere-like object; and
inverse-transforming a scale of the separated sphere-like object to obtain the original object.

40. A method according to claim 39, wherein transforming the scale of the object comprises rendering the sphere-like object with a parameter which is one of a group containing a diameter and a radius of the sphere-like object.

41. A method according to claim 39, wherein transforming the scale of the object comprises transforming an isotropic space into a non-isotropic space.

42. A method according to claim 39, further comprising:
inputting a two-dimensional boundary shape around the object,
wherein the obtaining the scale estimation is performed based on the input two-dimensional boundary shape.

43. A method according to claim 39, further comprising:
inputting a two-dimensional boundary shape around the object;
specifying a two-dimensional first processing range based on the input boundary shape;
applying a Laplacian-of-Gaussian filter with a two-dimensional kernel to the first processing range to obtain a two-dimensional scale of the object in first and second dimensions (x, y); and
applying a Laplacian-of-Gaussian filter with a one-dimensional kernel in the third dimension (z) within a second processing range based on the scale estimated for the object in the first and second dimensions (x, y).

44. A method according to claim 39, further comprising:
  obtaining the inverse-transformed object as the original object.

45. A method according to claim 39, wherein the separating the sphere-like object comprises performing a level-set segmentation.

46. A method according to claim 45, wherein the level-set segmentation is preformed based on a result of a region growing segmentation.

47. A method according to claim 45, wherein the object is one of a group comprising at least a lymph node, a lesion, a tumour and a nodule.

48. A method according to claim 39, further comprising:
  displaying information indicating the inverse-transformed object.

49. A method according to claim 39, wherein the object is one of a group comprising at least a lymph node, a lesion, a tumour and a nodule.

\* \* \* \* \*